(12) United States Patent
Jensen

(10) Patent No.: US 8,324,753 B2
(45) Date of Patent: Dec. 4, 2012

(54) METHOD AND APPARATUS FOR POWERING A DEVICE

(75) Inventor: Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 12/550,885

(22) Filed: Aug. 31, 2009

(65) Prior Publication Data

US 2011/0049900 A1 Mar. 3, 2011

(51) Int. Cl.
*H02P 9/00* (2006.01)
(52) U.S. Cl. ........................................................ 290/54
(58) Field of Classification Search ................ 290/54
See application file for complete search history.

(56) References Cited

U.S. PATENT DOCUMENTS

| | | | | |
|---|---|---|---|---|
| 3,256,737 A | * | 6/1966 | Sipin | 73/861.83 |
| 4,174,065 A | * | 11/1979 | Knauth | 236/49.1 |
| 4,250,745 A | * | 2/1981 | Blatter et al. | 73/114.32 |
| 4,370,776 A | * | 2/1983 | Kullik | 15/319 |
| 4,399,585 A | * | 8/1983 | Kullik et al. | 15/319 |
| 5,033,151 A | * | 7/1991 | Kraft et al. | 15/319 |
| 5,131,888 A | | 7/1992 | Adkins, II | |
| 5,459,360 A | * | 10/1995 | Varo et al. | 310/24 |
| 6,101,429 A | * | 8/2000 | Sarma et al. | 701/7 |
| 6,297,742 B1 | * | 10/2001 | Canada et al. | 340/635 |
| 6,612,188 B2 | * | 9/2003 | Hamilton | 73/861.78 |
| 6,703,718 B2 | * | 3/2004 | Calley et al. | 290/44 |
| 7,143,451 B2 | | 12/2006 | Lundgren | |
| 7,290,292 B1 | | 11/2007 | Nellon | |
| 7,454,968 B2 | * | 11/2008 | Stein | 73/170.01 |
| 7,455,582 B2 | | 11/2008 | Barrett | |
| 7,507,151 B1 | | 3/2009 | Parker et al. | |
| 7,508,318 B2 | * | 3/2009 | Casella et al. | 340/870.02 |
| 7,514,900 B2 | | 4/2009 | Sander et al. | |
| 7,562,414 B2 | * | 7/2009 | Oh et al. | 15/339 |
| 7,975,484 B1 | * | 7/2011 | Burns et al. | 60/686 |
| 2002/0186180 A1 | | 12/2002 | Duda | |
| 2008/0152482 A1 | | 6/2008 | Patel | |
| 2010/0085211 A1 | * | 4/2010 | Wang et al. | 340/870.02 |

FOREIGN PATENT DOCUMENTS

DE 2060823 B * 10/1977
DE 3205697 A * 9/1983

* cited by examiner

*Primary Examiner* — Joseph Waks
(74) *Attorney, Agent, or Firm* — Armstrong Teasdale LLP

(57) ABSTRACT

A power harvesting device for use with a machine that includes a fluid intake path is described. The power harvesting device includes at least one blade and a shaft that is coupled to the at least one blade. The shaft and the at least one blade are positioned within the fluid intake path of the machine. The power harvesting device is configured to harvest energy from a fluid flowing through the fluid intake path of the machine.

19 Claims, 2 Drawing Sheets

METHOD AND APPARATUS FOR POWERING A DEVICE

BACKGROUND OF THE INVENTION

The present application relates generally to measurement systems and, more particularly, to methods and apparatus for powering a device.

Known machines or other devices may exhibit vibrations or other abnormal behavior during operation. To measure such behavior, one or more sensors may be used to determine, for example, an amount of vibration exhibited in a motor drive shaft. Typically, to power such sensors, a power supply is coupled to the sensors through wires or other conductors. However, space and/or design constraints within a machine casing may cause the routing of such wires to be difficult and/or impractical. Moreover, the routing of such wires may be cost-prohibitive for non-critical machines.

In at least one known machine measurement system, one or more sensors parasitically harvest energy from machine vibrations. Such energy is converted to electrical energy to facilitate powering such sensors. However, machine vibrations may not be constant in duration or in amplitude. As such, energy derived from such vibrations may not be constant, and may be insufficient to consistently power one or more sensors.

BRIEF DESCRIPTION OF THE INVENTION

In one embodiment, a power harvesting device for use with a machine having a fluid intake path is provided. The power harvesting device includes at least one blade and a shaft that is coupled to the at least one blade. The shaft and the at least one blade are positioned within the fluid intake path of the machine. The power harvesting device is configured to harvest energy from a fluid flowing through the fluid intake path of the machine.

In another embodiment, a measurement system for use with a machine having a fluid intake path is provided. The measurement system includes at least one sensor assembly and a power harvesting device coupled to the at least one sensor assembly. The power harvesting device includes at least one blade and a shaft that is coupled to the at least one blade. The shaft and the at least one blade are positioned within the fluid intake path of the machine. The power harvesting device is configured to harvest energy from a fluid flowing through the fluid intake path of the machine.

In another embodiment, a method for assembling a measurement system is provided. The method includes providing at least one sensor assembly to monitor a machine, wherein the machine includes a fluid intake path. The method also includes coupling a power harvesting device to the at least one sensor assembly. The power harvesting device includes at least one blade and a shaft that is rotatably coupled to the at least one blade. The method also includes positioning the power harvesting device within the fluid intake path of the machine and coupling at least one magnet to the shaft.

DETAILED DESCRIPTION OF THE INVENTION

Figure 1:
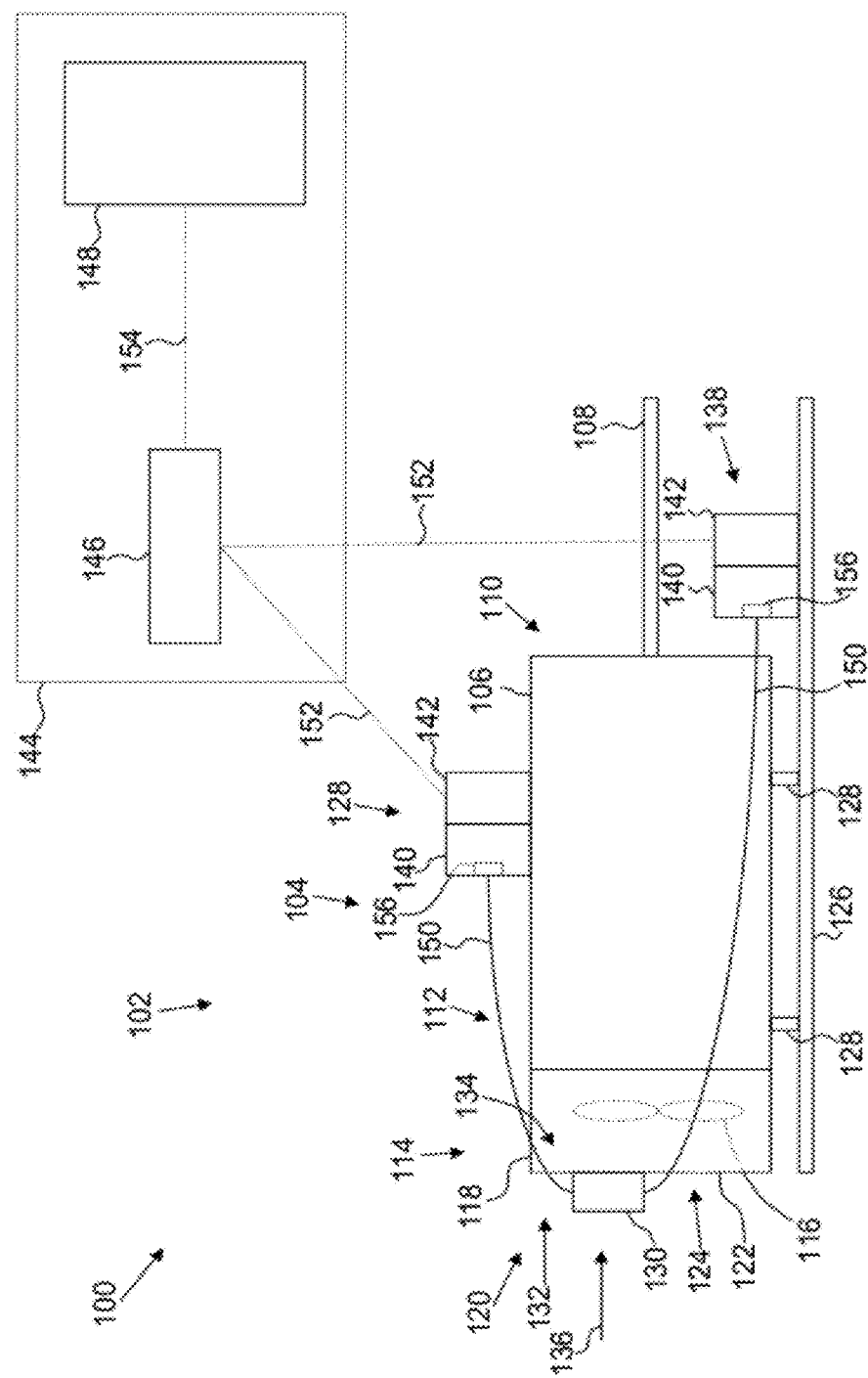
FIG. 1 is a block diagram of an exemplary measurement system 100.

FIG. 1 illustrates an exemplary measurement system 100. In the exemplary embodiment, measurement system 100 measures and/or monitors one or more operating conditions of a machine 102. In the exemplary embodiment, machine 102 includes a totally enclosed fan-cooled (TEFC) motor. In an alternative embodiment, machine 102 may include any other motor, generator, or other device that enables measurement system 100 to operate as described herein.

In the exemplary embodiment, machine 102 includes a motor 104 that is contained within a motor housing 106. A drive shaft 108 extends from an anterior portion 110 of motor housing 106 and is attached to a load (not shown) for rotatably driving the load. A fan assembly 114 is coupled to a posterior portion 112 of motor housing 106. Fan assembly 114 includes a fan 116 that is contained within a fan housing 118. A posterior portion 120 of fan assembly 114 includes a shroud 122 for supplying fan 116 with intake air. More specifically, shroud 122 includes at least one opening 124 that enables air to flow through shroud 122 during an operation of fan 116. Motor housing 106 is coupled to a motor base 126 via a plurality of mounting members 128.

In the exemplary embodiment, a power harvesting device 130 is coupled to fan assembly 114 to facilitate harvesting power from intake air entering fan assembly 114 via an intake airflow path 136. More specifically, power harvesting device 130 is coupled to a shroud exterior 132 such that device 130 is positioned within intake airflow path 136. In one embodiment, power harvesting device 130 extends across shroud 122 such that power harvesting device 130 covers or substantially covers shroud 122 and/or shroud opening 124. In an alternative embodiment, power harvesting device 130 is coupled to a shroud interior 134, or to any other location that enables device 130 to harvest power from air flowing through intake airflow path 136. Power harvesting device 130 provides power to one or more sensor assemblies 138 via one or more power conductors 150. In one embodiment, sensor assemblies 138 include one or more backup power sources 156, such as one or more batteries. In such embodiment, power harvesting device 130 may be configured to recharge backup power source 156. As used herein, the term "harvesting power" refers to receiving or gathering power from another energy source.

In the exemplary embodiment, measurement system 100 includes at least one sensor assembly 138. Sensor assembly 138 includes at least one sensor 140 that measures at least one operating condition of machine 102. Sensor 140 may be configured to measure a temperature, a rotational speed, an acceleration, an amount of vibration, and/or any other operational condition of machine 102, and/or any component of machine 102. Moreover, sensor 140 may measure one or more operational conditions of adjacent machines 102 and/or other structures. Sensor assembly 138 may be coupled to motor housing 106, to motor base 126, and/or to any component of measurement system 100 that enables sensor assembly 138 to operate as described herein. In one embodiment, sensor assembly 138 is magnetically coupled to motor housing 106 and/or to motor base 126. In another embodiment, sensor assembly 138 is coupled to motor housing 106 and/or motor base 126 via one or more bolts and/or screws. In the exemplary embodiment, sensor assembly 138 also includes a communication module 142 that facilitates transmitting data to and/or receiving data from a monitoring system 144. In the exemplary embodiment, communication module 142 includes a wireless transceiver. In an alternative embodiment, communication module 142 includes a wireless transmitter that enables communication module 142 to transmit data to monitoring system 144. Moreover, in the exemplary embodiment, a plurality of sensor assemblies 138 may be communicatively coupled together, for example, as part of a mesh network (not shown), in addition to being communicatively coupled to monitoring system 144. In the exemplary embodiment, power harvesting device 130 provides power to sensor 140 and to communication module 142 within sensor assembly 138. In an alternative embodiment, power harvesting device 130 powers only communication module 142. In yet another embodiment, power harvesting device 130 powers only sensor 140.

In the exemplary embodiment, monitoring system 144 includes a base station 146 and a processor 148. More specifically, in the exemplary embodiment, processor 148 is contained in a computer. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term "processor."

Communication module 142 is configured to be communicatively coupled to base station 146 via a sensor data connection 152. In an alternative embodiment, measurement system 100 does not include base station 146, and communication module 142 is configured to be communicatively coupled to processor 148 via sensor data connection 152. In the exemplary embodiment, sensor data connection 152 includes a wireless data connection, such as an Institute of Electrical and Electronics Engineering (IEEE) 802.11b wireless data connection. In an alternative embodiment, sensor data connection 152 includes any other 802.11 wireless data connection, an 802.15 wireless data connection, or a wireless data connection that uses any other communication protocol. In another embodiment, sensor data connection 152 includes a wired data connection, such as, for example, an Ethernet connection. In the exemplary embodiment, base station 146 is configured to be communicatively coupled to processor 148 via a base station data connection 154. In the exemplary embodiment, base station data connection 154 includes a wired Ethernet data connection. In an alternative embodiment, base station data connection 154 includes a wireless data connection, such as an IEEE 802.11b wireless data connection. In another embodiment, base station data connection 154 is any other 802.11 wireless data connection, an 802.15 wireless data connection, or a wireless or wired data connection that uses any other communication protocol.

In the exemplary embodiment, base station 146 includes a wireless or wired router, switch, and/or hub that facilitates transmitting data from sensor data connection 152 to processor 148 via base station data connection 154. In one embodiment, sensor data connection 152 uses a different communication protocol than base station data connection 154. In such embodiment, base station 146 facilitates translating data transmitted via sensor data connection 152 to base station data connection 154. In the exemplary embodiment, processor 148 is contained in a server. In an alternative embodiment, processor 148 is contained in a laptop computer, a desktop computer, a set-top box, a cellular phone, and/or a smart phone. In the exemplary embodiment, processor 148 is coupled to a memory and a display (all not shown).

Figure 2:
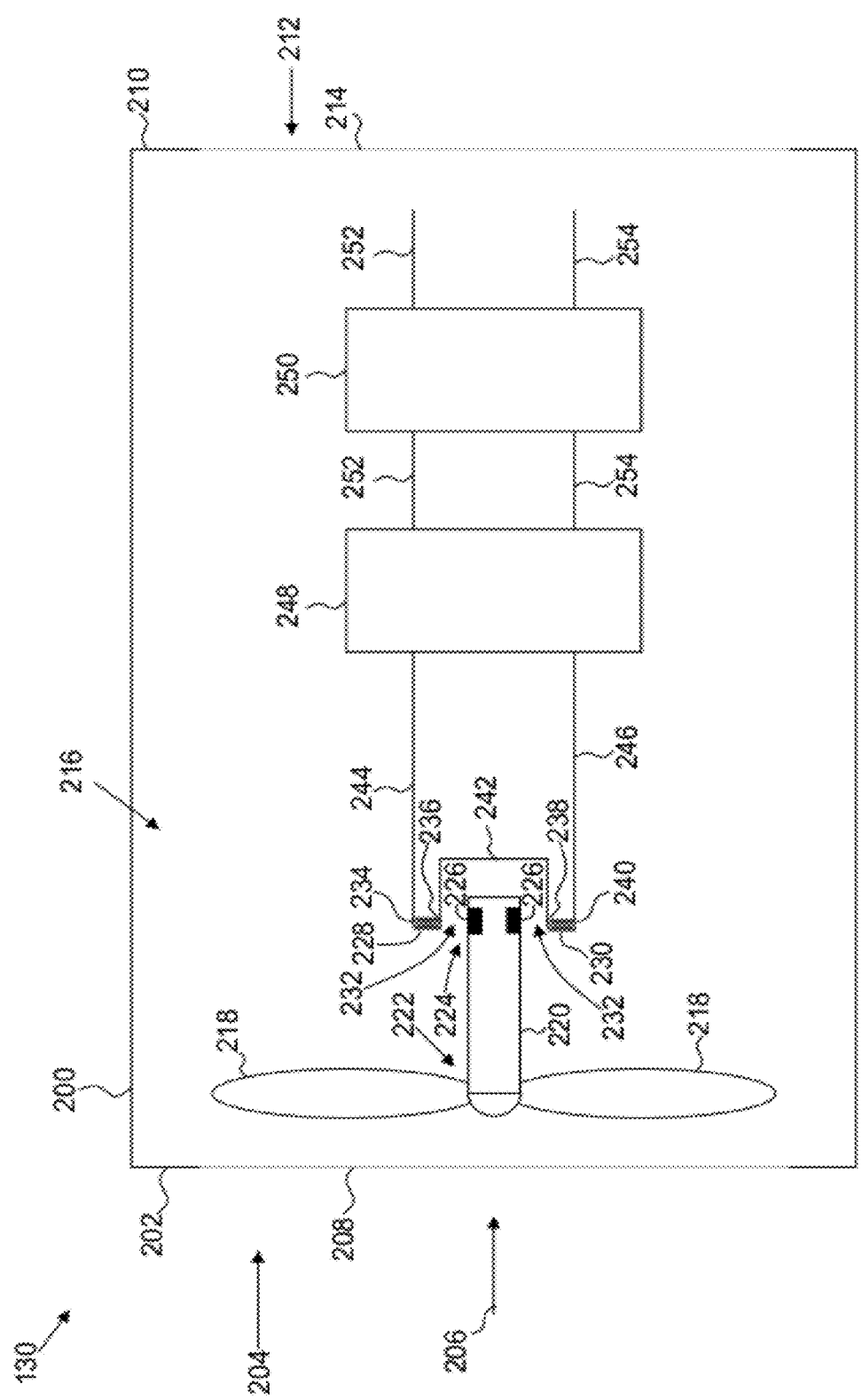
FIG. 2 is a block diagram of an exemplary power harvesting device that may be used with the measurement system shown in FIG. 1.

FIG. 2 is a schematic view of power harvesting device 130. In the exemplary embodiment, power harvesting device 130 is enclosed within a device housing 200 that is coupled to fan housing 118 of machine 102 (both shown in FIG. 1). In the exemplary embodiment, device housing 200 is coupled to fan housing 118 via one or more brackets and/or screws. In an alternative embodiment, device housing 200 is coupled to fan housing 118 via one or more magnets, an adhesive, or any other coupling mechanism that enables power harvesting device 130 to operate as described herein. In the exemplary embodiment, device housing 200 includes a posterior wall 202 that includes an opening 204 to facilitate receiving a flow of air 206, such as air from intake airflow path 136 (shown in FIG. 1). In one embodiment, posterior wall opening 204 is substantially covered by a mesh 208 that facilitates enabling air flow 206 to pass through device housing 200. In the exemplary embodiment, device housing 200 also includes an anterior wall 210 that includes an opening 212 that enables air flow 206 to be discharged into fan housing 118 via shroud opening 124 (shown in FIG. 1). In one embodiment, anterior wall opening 212 is substantially covered by a mesh 214 that enables air flow 206 to pass through device housing 200. In another embodiment, device housing 200 includes an airflow channeling body (not shown), such as, without limitation, a funnel-shaped body, that substantially circumscribes posterior wall opening 204 to facilitate channeling air flow 206 through opening 204.

In the exemplary embodiment, power harvesting device 130 includes a generator 216 that includes a plurality of blades 218. In the exemplary embodiment, generator blades 218 are substantially airfoil-shaped such that lift is induced to blades 218 when air flow 206 impacts blades 218. In an alternative embodiment, generator blades 218 are formed with any shape that enables generator 216 to operate as described herein. In the exemplary embodiment, generator blades 218 are coupled to a posterior portion 222 of a rotatable shaft 220. In the exemplary embodiment, generator 216 is coupled to device housing 200 via one or more mounting members (not shown). In an alternative embodiment, generator blades 218 are mounted externally to device housing 200 such that at least a portion of shaft 220 extends through anterior wall 210, anterior wall opening 212, and/or mesh 214.

A plurality of magnetic elements 226 are coupled to an anterior portion 224 of shaft 220. In the exemplary embodiment, magnetic elements 226 are substantially evenly spaced about a perimeter (not shown) of shaft anterior portion 224. In the exemplary embodiment, two magnetic elements 226 are coupled to shaft anterior portion 224. In an alternative embodiment, only one magnetic element 226 or more than two magnetic elements 226 are coupled to shaft anterior portion 224. Magnetic elements 226 generate a magnetic field proximate shaft 220. In the exemplary embodiment, magnetic elements 226 are magnets. In one embodiment, magnetic elements 226 are permanent magnets. In an alternative embodiment, magnetic elements 226 are any other type of magnet. In yet another embodiment, magnetic elements 226 include a plurality of windings of conductive metal (not shown). In such embodiment, a power source (not shown), such as a battery, may energize the windings of magnetic elements 226.

In the exemplary embodiment, generator 216 includes a first winding 228 and a second winding 230 that are positioned about shaft 220. More specifically, first and second windings 228 and 230 are positioned opposite each other, and shaft anterior portion 224 is positioned substantially between first and second windings 228 and 230. In the exemplary embodiment, shaft anterior portion 224 is positioned between first and second windings 228 and 230 such that an air gap 232 is formed between shaft anterior portion 224 and first winding 228, and between shaft anterior portion 224 and second winding 230. First and second windings 228 and 230 each include a plurality of coils of conductive material, such as metal wire. Magnetic elements 226 are magnetically coupled to first and second windings 228 and 230. First winding 228 includes a first terminal 234 and a second terminal 236, and second winding 230 includes a first terminal 238 and a second terminal 240. In the exemplary embodiment, first winding second terminal 236 is coupled to second winding first terminal 238 via a common conductor 242. First winding first terminal 234 is coupled to a first conductor 244, and second winding second terminal 240 is coupled to a second conductor 246.

In an alternative embodiment, magnetic elements 226 and first and second windings 228 and 230 are interchanged, such that windings 228 and 230 are positioned on shaft 220, and magnetic elements 226 are positioned about shaft 220. In such embodiment, a slip ring assembly or other contactor (not shown) may be used to transmit electricity between shaft 220 and generator 216.

In the exemplary embodiment, first and second conductors 244 and 246 are coupled to a rectifier circuit 248. In the exemplary embodiment, rectifier circuit 248 includes a plurality of diodes arranged as a full wave bridge rectifier. In an alternative embodiment, rectifier circuit 248 includes a plurality of diodes arranged as a half wave bridge rectifier. In another alternative embodiment, rectifier circuit 248 includes a plurality of diodes arranged as a full wave or half wave rectifier. In the exemplary embodiment, rectifier circuit 248 converts a negative polarity of first conductor 244 and/or second conductor 246 to a substantially positive polarity.

In the exemplary embodiment, rectifier circuit 248 outputs a substantially rectified current to a filter circuit 250 via a positive rail 252 and a neutral rail 254. Filter circuit 250 substantially normalizes a voltage and/or a current of positive rail 252 and/or neutral rail 254. As such, filter circuit 250 facilitates reducing a voltage and/or current amplitude fluctuation that may be present in positive rail 252 and/or neutral rail 254. In the exemplary embodiment, filter circuit 250 includes at least one capacitor. Filter circuit 250 outputs a substantially uniform peak voltage on positive rail 252 and a substantially uniform low voltage on neutral rail 254. In the exemplary embodiment, the low voltage is approximately equal to ground potential, and the peak voltage is between about 0.1 volts (V) and about 10V. In a more specific embodiment, the peak voltage is approximately equal to 5V. In the exemplary embodiment, positive and neutral rails 252 and 254 are coupled to one or more power conductors 150 (shown in FIG. 1). In an alternative embodiment, power harvesting device 130 does not include rectifier circuit 248 and/or filter circuit 250. In such an embodiment, generator 216 outputs a substantially unrectified and/or unfiltered current to positive and neutral rails 252 and 254.

In the exemplary embodiment, power harvesting device 130 is configured such that generator blades 218 are positioned upstream, with respect to air flow 206, of rectifier circuit 248, and rectifier circuit 248 is positioned upstream of filter circuit 250. In an alternative embodiment, power harvesting device 130 may be configured such that generator blades 218, rectifier circuit 248, filter circuit 250, and any other component of device 130 are coupled together in any arrangement with respect to air flow 206. In one embodiment, generator blades 218 are positioned downstream, with respect to air flow 206, of rectifier circuit 248 and filter circuit 250 such that air flow 206 flows past circuits 248 and 250 before reaching blades 218.

During operation, fan 116 (shown in FIG. 1) draws air flow 206 through intake airflow path 136 and device housing 200. Air flow 206 enters posterior wall opening 204 via mesh 208, flows past generator 216, and exits anterior wall opening 212 via mesh 214. As air flow 206 flows past generator 216, air flow impacts generator blades 218 and induces lift to blades 218. Generator blades 218 induce torque to shaft 220. Shaft 220 rotates in response to the induced torque, thus rotating magnetic elements 226 that are coupled to shaft posterior portion 222. Magnetic elements 226 magnetically couple to first and second windings 228 and 230, and at least one magnetic field traverses air gap 232. The rotation of magnetic elements 226 causes the magnetic field to rotate and induce an alternating current within first and second windings 228 and 230. Alternating current flows through first and second conductors 244 and 246 to rectifier circuit 248.

Rectifier circuit 248 rectifies the current flowing through first and second conductors 244 and 246 and outputs the rectified current via positive and neutral rails 252 and 254. As such, current flowing through positive and neutral rails 252 and 254 alternates between substantially zero current and substantially peak current. Likewise, a voltage between positive and neutral rails 252 and 254 alternates between substantially zero volts and a substantially peak voltage. Filter circuit 250 facilitates reducing the current and voltage amplitude fluctuation in positive and neutral rails 252 and 254. As such, filter circuit 250 facilitates transmitting a substantially uniform DC voltage across positive and neutral rails 252 and 254. The DC voltage is transmitted to power conductors 150 to facilitate powering one or more sensor assemblies 138 (shown in FIG. 1). It should be noted that in the exemplary embodiment, power harvesting device 130 is configured to continuously operate as long as fan 116 is operating.

Existing measurement systems 100 and/or machines 102 (shown in FIG. 1) may be retrofitted to use one or more power harvesting devices 130. One or more power harvesting devices 130 may be coupled to fan housings 118 and/or to other components of existing machines 102, and one or more power conductors 150 may be coupled between one or more power harvesting devices 130 and one or more sensor assemblies 138. Moreover, while power harvesting device 130 has been described as being used with air flow systems, device 130 is not limited to use with air. Rather, power harvesting device 130 may be used with any process fluid, such as other gases, liquids, and/or slurries.

The above-described embodiments provide an efficient and cost-effective device for powering sensor assemblies. The power harvesting device facilitates capturing energy from fluid flow entering a machine, and using that energy to power one or more sensor assemblies. The power harvesting device enables sensor assemblies to obtain power without having to route power conductors from an electrical grid or other power distribution system to the sensor assemblies. The power harvesting device facilitates providing a substantially constant amount of power to sensor assemblies. Moreover, existing machines may be retrofitted to use the power harvesting device.

Exemplary embodiments of an apparatus and method for powering a device are described above in detail. The method, apparatus, and system are not limited to the specific embodiments described herein, but rather, components of the apparatus and/or system and/or steps of the method may be utilized independently and separately from other components and/or steps described herein. For example, the power harvesting device may also be used in combination with other measurement systems and methods, and is not limited to practice with only a fan-cooled motor as described herein. Rather, the power harvesting device can be utilized in connection with many other fluid movement systems, such as industrial fans, cooling tower fans, exhaust fans, and/or pipe systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power harvesting device for use with a machine, the machine having a fluid intake path, said power harvesting device comprising:
   at least one blade;
   a shaft that is coupled to said at least one blade, said shaft and said at least one blade positioned within the fluid intake path of the machine, wherein said power harvesting device is configured to harvest energy from a fluid flowing through the fluid intake path of the machine and to convert the energy harvested into an electrical current that is output at a substantially uniform voltage; and
   a component powered by the electrical current output from said power harvesting device at a substantially uniform voltage.

2. A power harvesting device in accordance with claim 1, wherein said component is at least one sensor assembly.

3. A power harvesting device in accordance with claim 1, wherein said power harvesting device is coupled to at least one of a wireless data transmitter and a wireless data transceiver, said power harvesting device is further configured to power the at least one of a wireless data transmitter and a wireless data transceiver.

4. A power harvesting device in accordance with claim 1, wherein said power harvesting device comprises at least one magnet coupled to said shaft.

5. A power harvesting device in accordance with claim 4, wherein said power harvesting device comprises at least one conductor comprising at least one coil, said at least one conductor is configured to conduct the electrical current when a rotation of said shaft causes said at least one magnet to induce a magnetic flow in said at least one coil.

6. A power harvesting device in accordance with claim 5, wherein said at least one conductor is coupled to a rectification circuit to transform the electrical current into a substantially direct current.

7. A power harvesting device in accordance with claim 5, wherein said at least one conductor is coupled to a filter circuit to facilitate reducing an amplitude variation in the electrical current.

8. A power harvesting device in accordance with claim 1, wherein said power harvesting device is positioned within a fluid intake path of a totally enclosed fan cooled (TEFC) machine.

9. A power harvesting device in accordance with claim 1, wherein said power harvesting device comprises a housing, the fluid flows through said power harvesting device housing.

10. A measurement system for use with a machine having a fluid intake path, said measurement system comprising:
    a power harvesting device coupled to said at least one sensor assembly, said power harvesting device comprising:
       at least one blade; and
       a shaft coupled to said at least one blade, said shaft and said at least one blade positioned within the fluid intake path of the machine, said power harvesting device is configured to harvest energy from a fluid flowing through the fluid intake path of the machine and to convert the energy harvested into an electrical current that is output to provide power; and
    at least one sensor assembly electrically coupled to said harvesting device to receive said electrical current output for use powering said at least one sensor assembly.

11. A measurement system in accordance with claim 10, wherein said power harvesting device is coupled to at least one of a wireless data transmitter and a wireless data transceiver, said power harvesting device is further configured to power the at least one of a wireless data transmitter and a wireless data transceiver.

12. A measurement system in accordance with claim 10, wherein said power harvesting device comprises at least one magnet coupled to said shaft.

13. A measurement system in accordance with claim 12, wherein said power harvesting device comprises at least one conductor comprising at least one coil, said at least one conductor is configured to conduct the electrical current when a rotation of said shaft causes said at least one magnet to induce a magnetic flow in said at least one coil.

14. A measurement system in accordance with claim 13, wherein said at least one conductor is coupled to a rectification circuit to transform the electrical current into a substantially direct current.

15. A measurement system in accordance with claim 13, wherein said at least one conductor is coupled to a filter circuit to facilitate reducing an amplitude variation in the electrical current.

16. A measurement system in accordance with claim 10, wherein said power harvesting device is positioned within a fluid intake path of a totally enclosed fan cooled (TEFC) machine.

17. A measurement system in accordance with claim 10, wherein said power harvesting device comprises a housing, the fluid flows through said power harvesting device housing.

18. A method for assembling a measurement system, said method comprising:
    providing at least one sensor assembly to monitor a machine, the machine including a fluid intake path;
    coupling a power harvesting device to the at least one sensor assembly, wherein the power harvesting device includes at least one blade, and a shaft that is rotatably coupled to the at least one blade;
    positioning the power harvesting device within the fluid intake path of the machine;
    coupling at least one magnet to the shaft to facilitate converting energy harvested from a fluid flowing through the fluid intake path into an electrical current; and
    outputting the electrical current to the at least one sensor assembly to power the at least one sensor assembly.

19. A method in accordance with claim 18, wherein said method further comprises
    providing at least one conductor having at least one coil configured to magnetically couple to the at least one magnet.

* * * * *